United States Patent
Gruber et al.

(10) Patent No.: US 11,389,854 B2
(45) Date of Patent: Jul. 19, 2022

(54) TOOL MAGAZINE FOR A BENDING MACHINE

(71) Applicant: TRUMPF Maschinen Austria GmbH & Co. KG., Pasching (AT)

(72) Inventors: Stefan Gruber, Andorf (AT); Christoph Sefler, Wolfern (AT)

(73) Assignee: TRUMPF Maschinen Austria GmbH & Co. KG., Pasching (AT)

(*) Notice: Subject to any disclaimer, the term of this patent is extended or adjusted under 35 U.S.C. 154(b) by 355 days.

(21) Appl. No.: 16/464,363

(22) PCT Filed: Dec. 19, 2017

(86) PCT No.: PCT/AT2017/060339
§ 371 (c)(1),
(2) Date: May 28, 2019

(87) PCT Pub. No.: WO2018/112493
PCT Pub. Date: Jun. 28, 2018

(65) Prior Publication Data
US 2021/0129205 A1    May 6, 2021

(30) Foreign Application Priority Data
Dec. 21, 2016 (AT) .............. A 51168/2016

(51) Int. Cl.
*B21D 37/00* (2006.01)
*B23Q 3/155* (2006.01)
*B21D 37/14* (2006.01)

(52) U.S. Cl.
CPC ....... *B21D 37/145* (2013.01); *B23Q 3/15526* (2013.01); *Y10T 483/1731* (2015.01); *Y10T 483/18* (2015.01); *Y10T 483/1845* (2015.01)

(58) Field of Classification Search
CPC ........ Y10T 483/1729; Y10T 483/1731; B23Q 3/155–3/15793; B21D 37/145
(Continued)

(56) References Cited

U.S. PATENT DOCUMENTS 5,720,535 A * 2/1998 Mehman ............... E05B 65/462
312/218
6,024,681 A   2/2000 Latten et al.
(Continued)

FOREIGN PATENT DOCUMENTS

AT    516 624 B1   7/2016
DE    2844867 A1   4/1980
(Continued)

OTHER PUBLICATIONS

International Search Report in PCT/AT2017/060339, dated Mar. 26, 2018.
(Continued)

*Primary Examiner* — Erica E Cadugan
(74) *Attorney, Agent, or Firm* — Collard & Roe, P.C.

(57) ABSTRACT

The invention relates to a tool magazine (26) for a bending machine (3), in particular for a press brake, wherein the tool magazine (26) has several storage rails (28), which are arranged in a magazine housing (27) and serve to hold bending tools (4), wherein the storage rails (28) are designed in such a way that several bending tools (4) can fit lined up one behind the other in the longitudinal extension (30) of the storage rails. The storage rails (28) can be pulled out from a front side (29) of the magazine housing (27) in the direction of the longitudinal extension (30) of the storage rails.

20 Claims, 5 Drawing Sheets

(58) Field of Classification Search
USPC .................................................. 483/28–29
See application file for complete search history.

(56) References Cited

U.S. PATENT DOCUMENTS

| | | | |
|---|---|---|---|
| 6,904,665 B2 | 6/2005 | Walz | |
| 7,029,429 B2 | 4/2006 | Akami et al. | |
| 9,089,963 B2* | 7/2015 | Freimuth | A47B 81/00 |
| 9,156,158 B2* | 10/2015 | Freimuth | A47B 88/95 |
| 2004/0104652 A1* | 6/2004 | Holmes | G07F 17/0092 |
| | | | 312/348.3 |
| 2009/0139296 A1 | 6/2009 | McCauley | |
| 2011/0121699 A1* | 5/2011 | Freimuth | B25H 3/028 |
| | | | 312/237 |
| 2014/0167575 A1* | 6/2014 | Freimuth | E05B 65/462 |
| | | | 312/220 |
| 2014/0225494 A1 | 8/2014 | Freimuth | |
| 2017/0297073 A1 | 10/2017 | Sato | |
| 2017/0297074 A1 | 10/2017 | Seibert et al. | |

FOREIGN PATENT DOCUMENTS

| | | |
|---|---|---|
| DE | 20 2014 007 901 U1 | 1/2016 |
| EP | 0 838 278 A1 | 4/1998 |
| EP | 1 418 019 A1 | 5/2004 |
| EP | 2 138 247 A2 | 12/2009 |
| EP | 2 138 247 B1 | 12/2009 |
| EP | 2 865 458 A1 | 4/2015 |
| EP | 2 913 114 A1 | 9/2015 |
| EP | 3 210 683 A1 | 8/2017 |
| JP | H10-71499 A | 3/1998 |
| JP | 2001-150032 A | 6/2001 |
| JP | 2003-136143 A | 5/2003 |
| JP | 2007098561 A | 4/2007 |
| JP | 2009-113082 A | 5/2009 |
| JP | 2015-120182 A | 7/2015 |
| JP | 2020-069519 A * | 5/2020 |
| NL | 1029416 C1 | 1/2006 |
| WO | 00/41824 A1 | 7/2000 |
| WO | 2004/024361 A1 | 3/2004 |
| WO | 2012/151601 A1 | 11/2012 |
| WO | 2016/055906 A1 | 4/2016 |

OTHER PUBLICATIONS

Letter of Austrian Patent Attorney to European Patent Office in PCT/AT2017/060339, dated Oct. 19, 2018, with English translation of relevant parts.

* cited by examiner

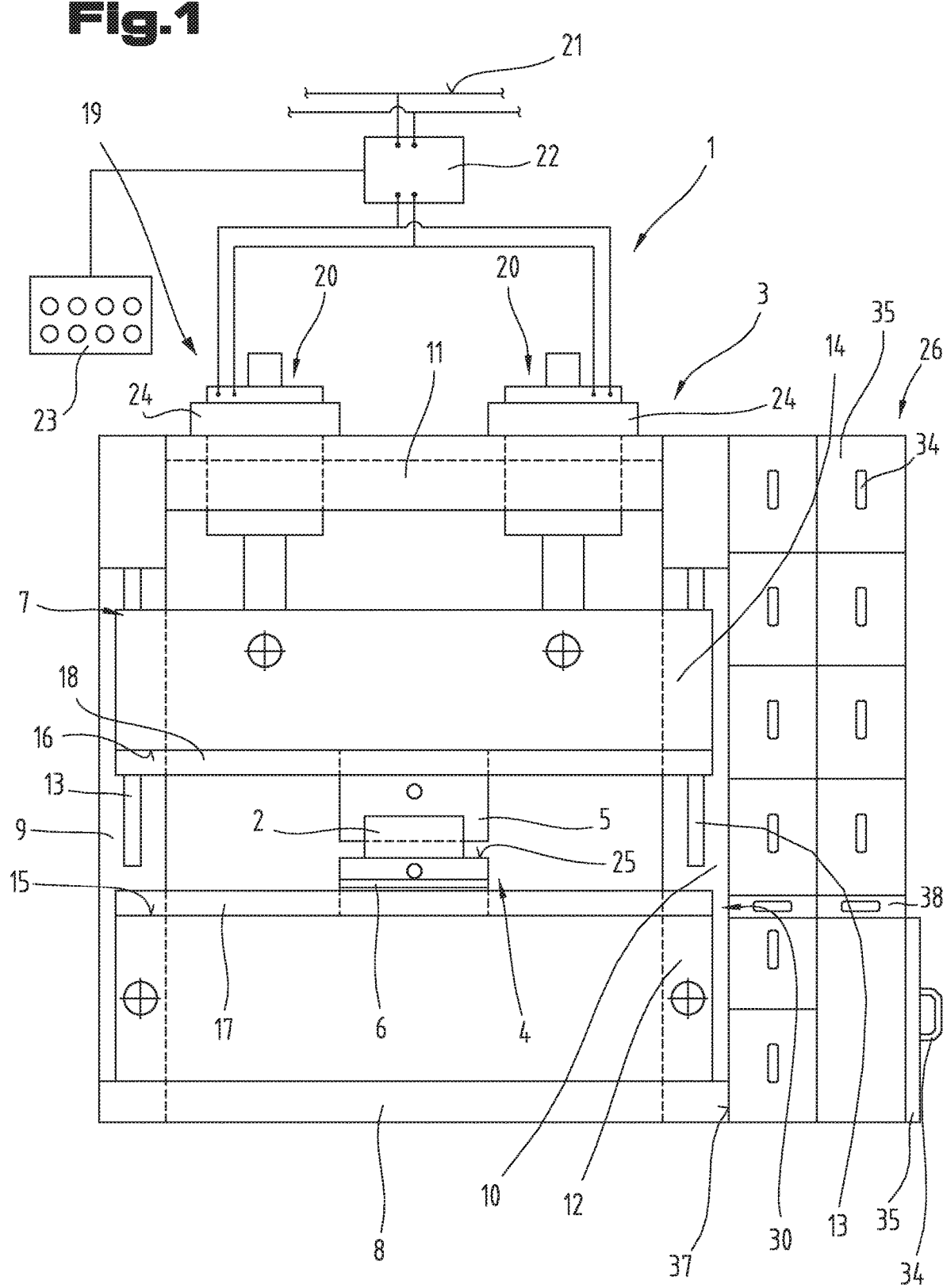

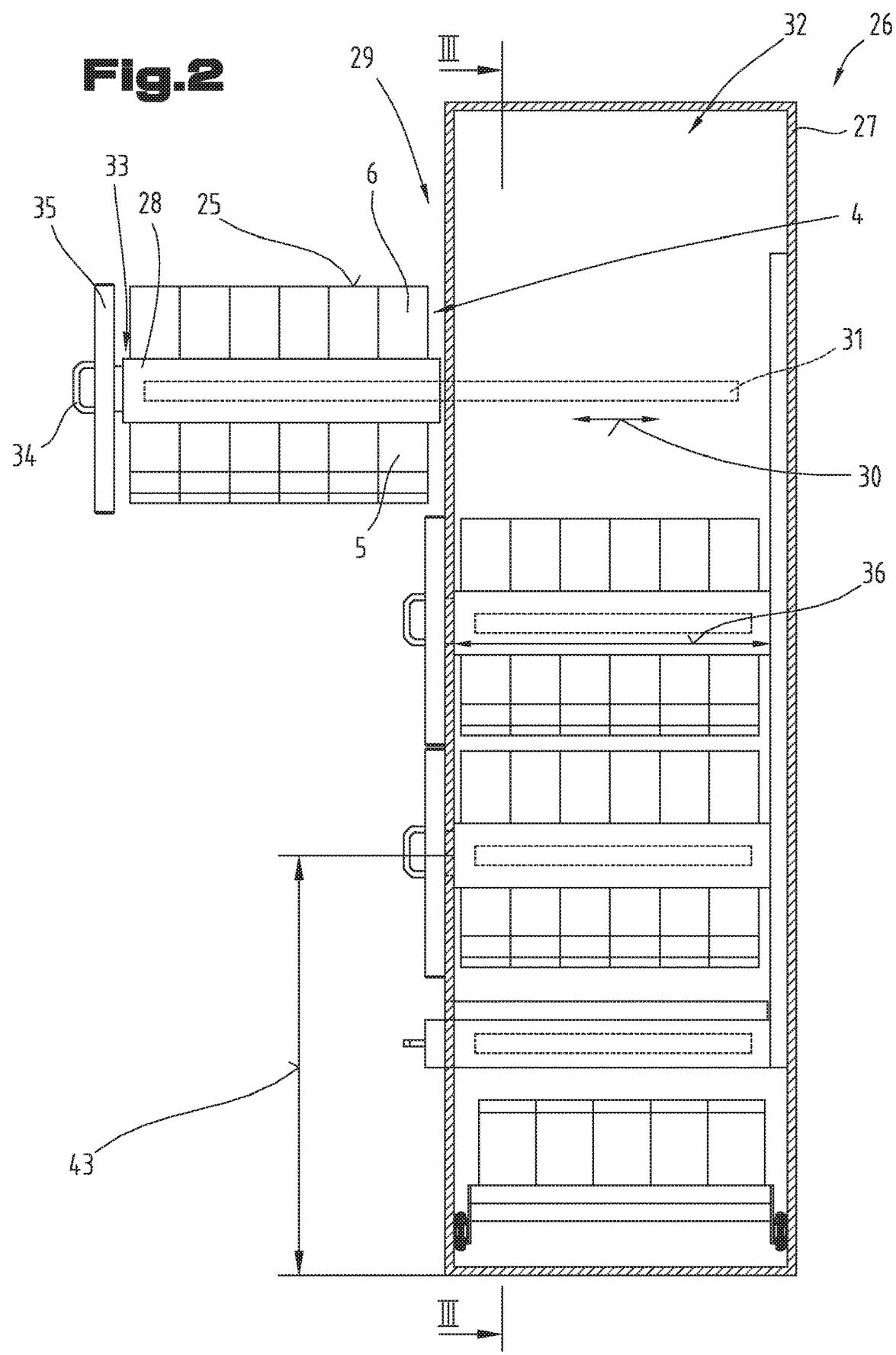

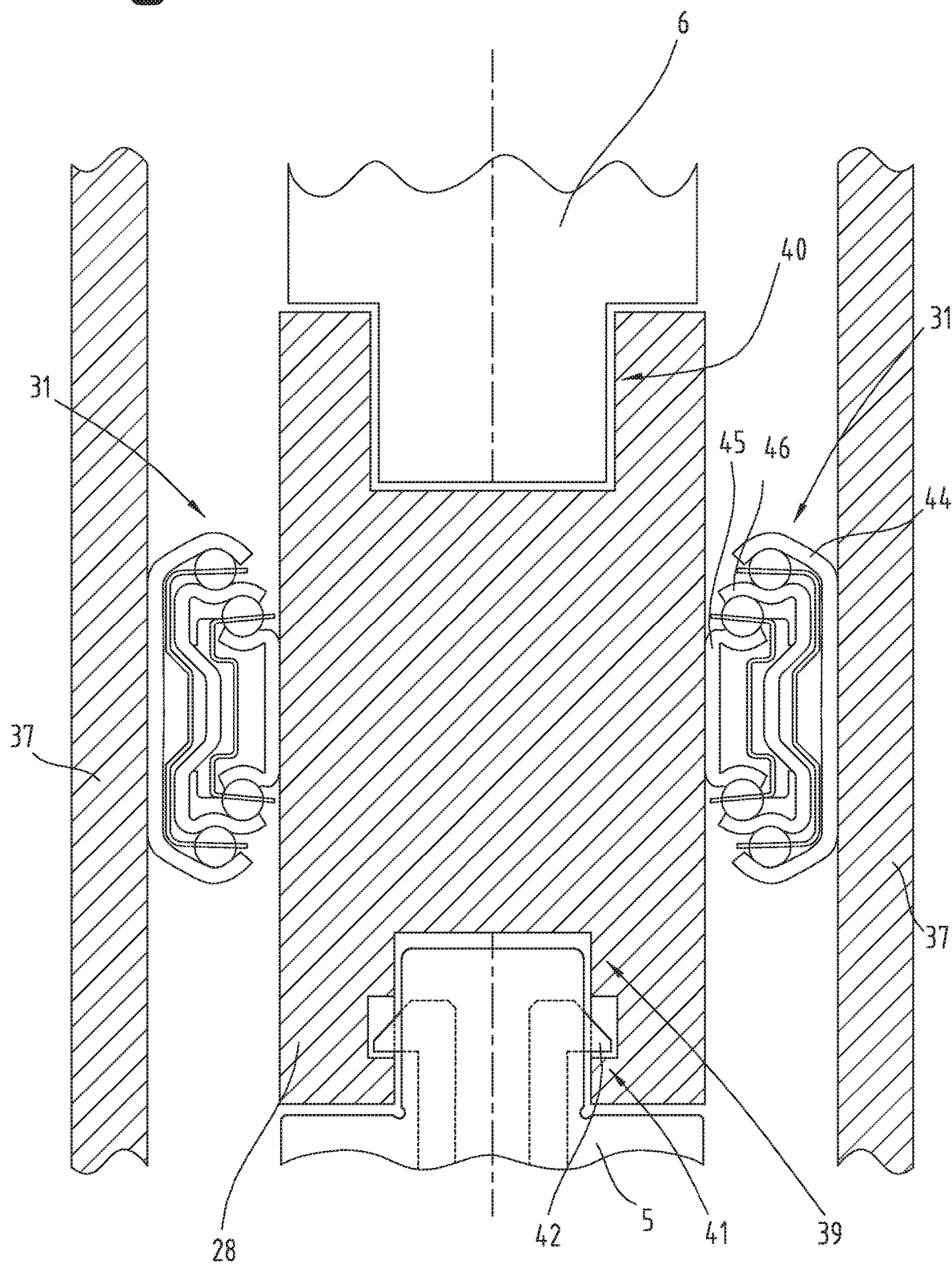

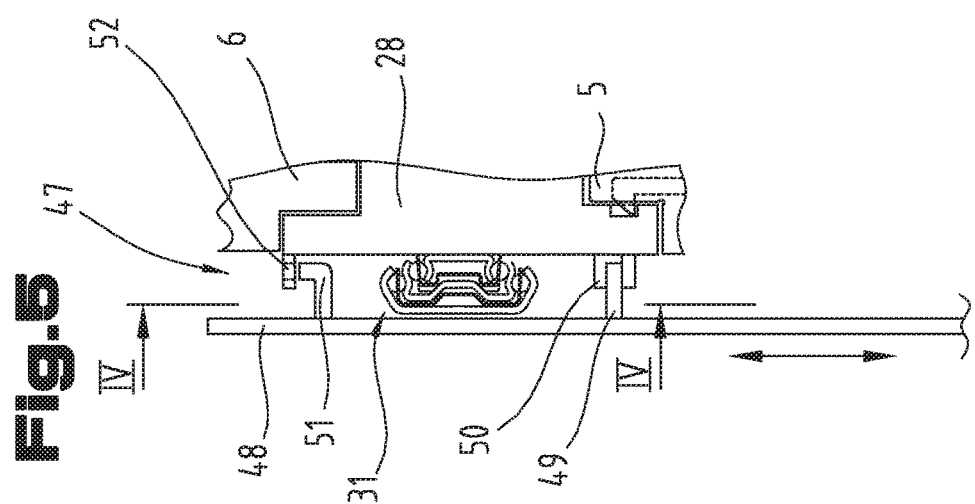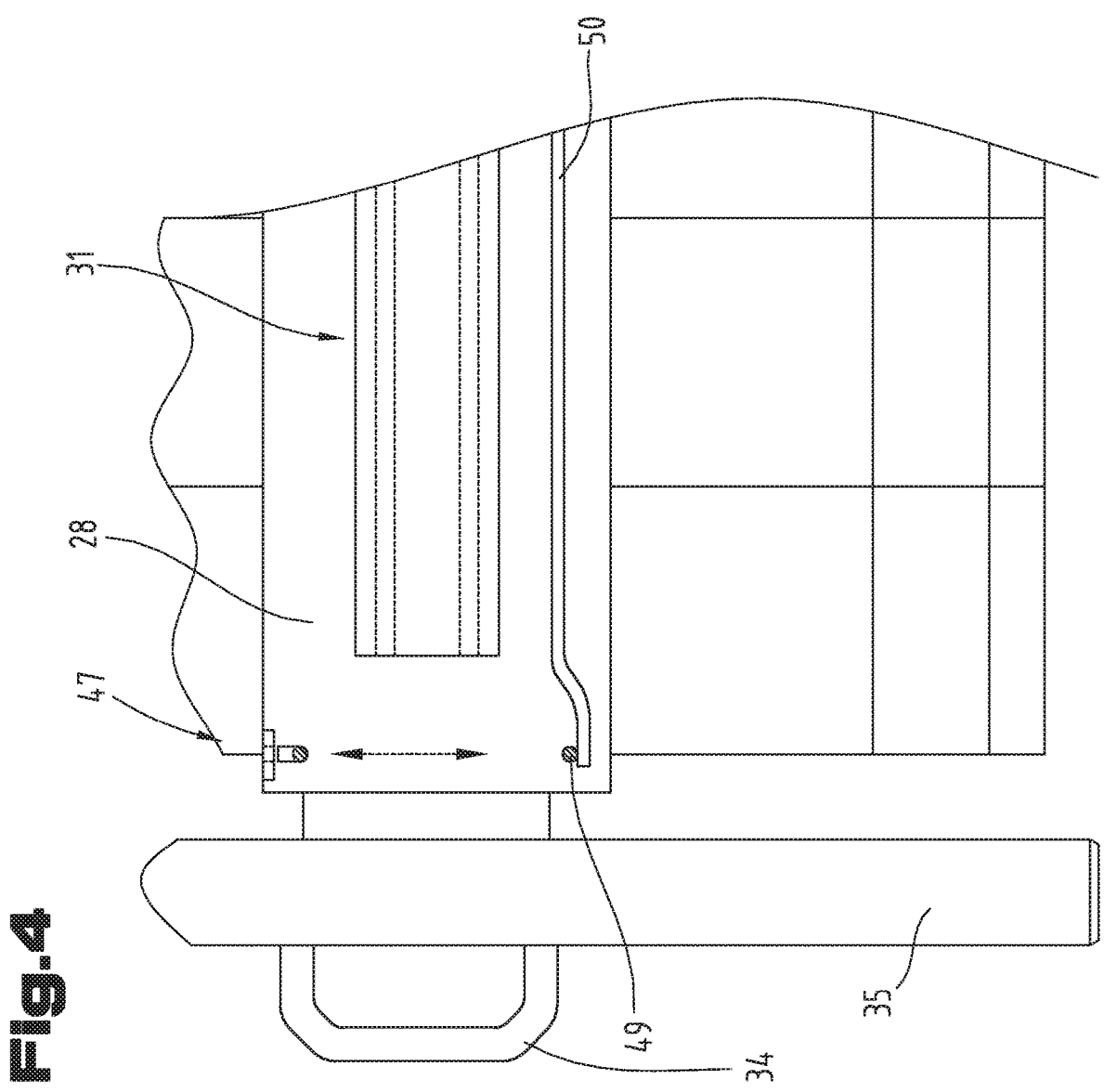

Tool Magazine Wherein Individual Ones of the Storage Rails Are Adjustable In Height

Fig. 6

TOOL MAGAZINE FOR A BENDING MACHINE

CROSS REFERENCE TO RELATED APPLICATIONS

This application is the National Stage of PCT/AT2017/060339 filed on Dec. 19, 2017, which claims priority under 35 U.S.C. § 119 of Austrian Application No. A 51168/2016 filed on Dec. 21, 2016, the disclosure of which is incorporated by reference. The international application under PCT article 21(2) was not published in English.

The invention relates to a tool magazine for a bending machine.

A tool storage that is arranged next to the press brake and that serves for holding several bending tools is known from JP2015120182A.

The tool storage known from JP2015120182A has a complex construction and is thus prone to errors.

The object of the present invention was to overcome the disadvantages of the prior art and to provide a tool magazine for a production installation comprising a simple construction despite high functionality.

This object is achieved by means of an apparatus and a method according to the claims.

According to the invention, a tool magazine for a bending machine, in particular for a press brake, is formed. The tool magazine has several storage rails, which are arranged in a magazine housing and serve to hold bending tools, wherein the storage rails are designed in such a way that several bending tools can fit lined up one behind the other in the longitudinal extension of the storage rails. The storage rails can be pulled out from a front side of the magazine housing in the direction of the longitudinal extension of the storage rails.

The advantage of the formation of the tool magazine according to the invention is that due to the drawer concept, it has a simple construction. Furthermore, due to their capability of being pulled out from the front side of the magazine housing, the storage rails are easily accessible to the machine operator, whereby the tool magazine is easily accessible to the machine operator and the individual bending tools may be removed from the storage rails without excessive force.

Moreover, it may be useful if the storage rails can be pulled out of the magazine housing individually and independently from one another. In this respect, it is advantageous that it may be achieved by this measure that merely that storage rail must be pulled out of the tool magazine, in which the desired bending tools are held. Thereby, due to the low mass to be moved, the force for pulling out the storage rail may be kept low and the ergonomics of the tool magazine may thus be further increased.

It may further be provided for that the individual storage rails are arranged one above the other in the magazine housing. In this respect, it is advantageous that by this measure, the tool magazine may have a small width and the height of the tool magazine may serve as storage.

Moreover, it may be provided for that one of the storage rails is respectively designed for holding a bending punch and a bending die, wherein a lower receiving groove is designed for holding the bending punch and an upper receiving groove is designed for holding the bending die. In this respect, it is advantageous that by this measure, the bending punches and bending dies belonging together can be arranged on a common storage rail and are thus available to the machine operator in an organized manner. Moreover, by this measure, the required number of storage rails can be reduced, as double the number of bending tools may be held per storage rail. A further advantage of this embodiment of the storage rails is that the bending punches may be held in the correct position in the storage rail from the outset and the ergonomics of the tool magazine can thus be further increased.

An embodiment, according to which it may be provided for that a recess, in which a locking tab of the bending punch may engage, is arranged in the lower receiving groove, is also advantageous. Thereby, it may be achieved that particularly formed bending tools, as are for example described in WO 2004/024361A1, may be inserted into the storage rail directly from below.

According to a further embodiment, it is possible that the storage rail is held in the magazine housing by means of a telescopic rail system. In this respect, it is advantageous that by this measure, the storage rails may be entirely pulled out of the magazine housing, in order to thereby achieve a better accessibility of the bending tools.

Moreover, it may be useful if the telescopic rail system comprises a first sliding rail, which is held on the magazine housing, a second sliding rail, which is held on the storage rail and at least one third further sliding rail arranged between the two sliding rails, wherein the individual sliding rails are coupled to one another by means of a sliding guide or by means of bearing balls. Particularly a thus formed telescopic rail system has a surprisingly good functionality of the pull-out system with high stiffness and slender dimensioning.

In addition to this, it may be provided for that a handle is arranged on the front sides of individual ones of the storage rails. In this respect, it is advantageous that the storage rails may be easily pulled out of the tool magazine by this measure.

Furthermore, it may be provided for that a faceplate section is arranged on the front sides of individual ones of the storage rails. The advantage of this is that with drawn-in storage rails, the front side of the tool magazine is widely closed off and thereby, an accumulation of dirt in the tool magazine can be prevented.

According to a special embodiment, it is possible that several storage rail compartments are arranged next to one another in the magazine housing, wherein in individual ones of the storage rail compartments, several storage rails are arranged on top of one another. In this regard, it is of advantage that by this measure, the capacity of the tool magazine may be increased.

According to an advantageous further embodiment, it may be provided for that at least one of the storage rails can be pulled out from a lateral wall of the magazine housing transversely to the longitudinal extension. A thus formed storage rail may particularly serve for holding heavy bending tools, which would overstrain the statics of storage rails that can be pulled out longitudinally.

In particular, it may be advantageous if more than 50% of the storage rails are arranged at a height of between 60 cm and 170 cm from the ground. In this regard, it is advantageous that by this measure, the majority of the commonly used bending tools may be removed from the tool magazine by the machine operator particularly ergonomically at the mentioned height.

It may further be provided for that individual ones of the storage rails are adjustable in height. In this regard, it is advantageous that by this measure, the storage rails may be moved to a height at which the individual bending tools can be easily and ergonomically removed from the tool magazine.

In addition to this, it may be provided for that the individual storage rails are arranged on a circulation system. The advantage of this is that a large number of storage rails can be held in the tool magazine and that for removing the bending tools from the storage rails, the storage rails may be provided at an ergonomic height.

An embodiment according to which it may be provided for that the individual storage rails are locked with respect to one another by means of a locking device, such that in the pulled-out state of a storage rail, the further storage rails cannot be pulled out, is also advantageous. Thereby, it may be achieved that several storage rails cannot be pulled out of the tool magazine simultaneously. It may thus be prevented that the stability against tilting of the tool magazine is weakened, which would result in an increased risk of accidents.

According to a further embodiment, it is possible that in addition to the storage rails, a tool tray is held in the magazine housing and may be pulled out from its front side. The advantage of this is that by this measure, measuring tools or other material may be stored in the tool magazine in addition to the bending tools.

Furthermore, it may be useful if the storage rails have a length of between 50 cm and 200 cm, in particular between 80 cm and 150 cm. Especially storage rails in this length range represent a good compromise between sufficient receiving capacity and sufficiently high strength of the tool magazine.

Furthermore, a production installation comprising a bending machine and a tool magazine, which is arranged next to a side wall of the bending machine, may be provided for. In this regard, the tool magazine is designed as described above.

The advantage of such a layout of the production installation is that the tool magazine is arranged next to the bending machine such that it is easily accessible to the machine operator. Thereby, ergonomically beneficial working is possible.

The storage rail may preferably be formed from a material which has a low density at sufficient strength. Such a material can for example be aluminum. Furthermore, such a material can for example also be a plastic material. Alternatively or additionally, it may be provided for that the storage rail is for example formed as a hollow body for the purpose of weight minimization. This may for example be achieved by manufacturing a continuously cast hollow profile. It may further be provided for that the storage rail is formed from a sheet metal fitting.

For the purpose of better understanding of the invention, it will be elucidated in more detail by means of the figures below.

These show in a respectively very simplified schematic representation:

FIG. 1 a schematic representation of a production installation with a bending machine and a tool magazine;

FIG. 2 a sectional view of a first exemplary embodiment of a tool magazine;

FIG. 3 a detailed view of a storage rail in the tool magazine;

FIG. 4 a side view of a second exemplary embodiment of the storage rail in the tool magazine;

FIG. 5 a detailed view of the second exemplary embodiment of the storage rail in the tool magazine; and FIG. 6 a schematic depiction of a feature of an embodiment of the tool magazine.

First of all, it is to be noted that in the different embodiments described, equal parts are provided with equal reference numbers/equal component designations, where the disclosures contained in the entire description may be analogously transferred to equal parts with equal reference numbers/equal component designations. Moreover, the specifications of location, such as at the top, at the bottom, at the side, chosen in the description refer to the directly described and depicted figure and in case of a change of position, these specifications of location are to be analogously transferred to the new position.

The term "particularly/in particular" is hereinafter understood such that it may refer to a possible, more specific embodiment and more detailed specification of a subject matter or a method step, but does not necessarily have to represent an obligatory, preferred embodiment of the latter or an approach.

FIG. 1 shows an embodiment variant of a production installation 1 for air bending workpieces 2 to be manufactured from sheet metal in a schematically simplified representation.

The production installation 1 comprises a bending machine 3, in particular a press brake, for manufacturing the workpieces 2/parts between bending tools 4, such as bending punch 5 and bending die 6, adjustable relative to one another. In this respect, the bending punch 5 may also be referred to as upper tool and the bending die 6 may also be referred to as lower tool.

A machine frame 7 of the bending machine 3 for example comprises a base plate 8 on which side walls 9, 10 may be arranged, which rise vertically, are transversely spaced from one another and are oriented in parallel to one another. These are preferably connected to one another by a massive cross connection 11 for example formed from a sheet metal preform on their end regions distanced from the base plate 8.

The side walls 9, 10 may be formed approximately in a C-shape for the formation of a free space for forming the workpiece 2, wherein a fixed press beam 12, particularly rising from the base plate 8, may be mounted to the side walls 9, 10. This press beam 12 may also be referred to as table beam. Moreover, a further press beam 14 adjustable relative to the press beam 12, in particular a pressure beam, may be mounted in a guided manner in linear guides 13.

On end faces 15, 16 opposing one another and extending in parallel to one another of the two press beams 12, 14, tool mounts 17, 18 for equipping with the bending tools 4 may be arranged/formed.

The shown bending machine 3 comprises at least one, here two driving means 20 as driving arrangement 19 for the adjustable press beam 14, namely the pressure beam, which are for example supplied with electric energy from an energy grid 21 or by a hydraulic circuit and may additionally be line-connected with a controller 22. The operation of the bending machine 3 is for example controlled via an input terminal 23 line-connected with the controller 22.

The driving means 20 may for example be electro-motor driven spindle drives 24, as generally known.

However, independently of this, it would also be possible that the driving means 20 is/are formed by adjusting means that can be hydraulically and/or pneumatically actuated. In this regard, cylinder-piston arrangements may be applied. However, other driving means, such as eccentric drives, toggle lever drives, rack and pinion drives etc., are also conceivable.

All design features/individual features of the figure descriptions mentioned above are mentioned to describe an exemplary production installation 1/bending machine 3 which may be referred to in the following part of the figure description essential to the invention. Thus, all individual features described are not obligatorily required for the embodiment according to the invention and may be omitted, or replaced by other features, in order to obtain a functional bending machine 3.

The bending tools 4 have a bending edge 25 extending in a longitudinal direction of the bending tool 4. The bending edge 25 also defines the path of the bending line on the workpieces 2 to be bended. The bending tools 4 may be held in the tool mount 17, 18 such that these are slidable when required in a direction parallel to the bending edge 25.

As may further be gathered from FIG. 1, it may be provided for that the production installation 1 comprises a tool magazine 26, which serves to hold the bending tools 4.

It may particularly be provided for that the tool magazine 26 is arranged next to one of the side walls 9, 10 of the bending machine 3. It may further be provided for that a tool magazine 26 is arranged on both sides of the bending machine 3 next to the side walls 9, 10.

In addition to this, it is also conceivable that two tool magazines 26 are arranged next to one another next to one of the side walls 9, 10 of the bending machine 3.

FIG. 2 shows a further and possibly independent embodiment of the tool magazine 26, wherein again, equal reference numbers/component designations are used for equal parts as before in FIG. 1. In order to avoid unnecessary repetitions, it is pointed to/reference is made to the detailed description in FIG. 1 preceding it.

FIG. 2 shows a side view of a further exemplary embodiment of the tool magazine 26, wherein a magazine housing 27 of the tool magazine 26 is shown sectionally, such that the interior of the tool magazine 26 can be seen.

The further description is based on a combination of FIGS. 1 and 2. As can be seen from FIG. 2, it may be provided for that several storage rails 28 serving for holding bending tools 4 are arranged in the magazine housing 27. It may particularly be provided for that several storage rails 28 are held in the magazine housing 27, wherein the storage rails 28 may be pulled out from a front side 29 of the tool magazine 26.

In this regard, it is particularly provided for that the storage rails 28 may be pulled out from the magazine housing 27 in the direction of their longitudinal extension 30. In this regard, the longitudinal extension 30 of the storage rail 28 is defined as the direction in which several bending tools 4 may be held in the storage rail 28 one behind the other. In other words, the longitudinal extension 30 of the storage rail 28 is parallel to the bending edge 25 of bending tools 4 held in the storage rail 28.

It may particularly be provided for that the storage rails 28 can be pulled out from the magazine housing 27 analogously to a drawer system. Such a drawer system may for example be achieved by means of a telescopic rail system 31. In this regard, it may particularly be provided for that a telescopic rail system 31 is arranged on both sides of the storage rail 28.

Several storage rails 28 arranged above one another form a storage rail compartment 32. As can be seen from FIG. 1, it may be provided for that several storage rail compartments 32 are arranged next to one another in a common magazine housing 27, each storage rail compartment 32 comprising several storage rails 28 that are arranged on top of one another. It is particularly provided for that the storage rails 28 may be pulled out from the tool magazine 26 individually and independently from one another.

In this regard, it may be provided for that in a state in which they are pulled out from the tool magazine 26, the storage rails 28 project in cantilever manner with respect to the magazine housing 27 and are merely held by the telescopic rail system 31. At this, the telescopic rail system 31 is loaded with a considerable bending moment due to the mass of the individual bending tools 4 held in the storage rail 28. It is therefore necessary that the telescopic rail system 31 is formed with sufficient stability for being capable of holding the bending moment applied by the storage rail 28.

Moreover, a handle 34 that may be gripped by the machine operator for pulling the storage rail 28 out from the magazine housing 27 may be arranged on a front side 33 of the storage rail 28.

The handle 34 may be designed/arranged in various different ways. In this regard, it is merely important that the handle 34 may be gripped by the machine operator ergonomically to allow for the storage rail 28 to be pulled out from the magazine housing 27 easily and as effortlessly as possible.

In addition to this, it may be provided for that a faceplate section 35, which covers the front side 33 of the storage rail 28 and which is in contact with the magazine housing 27 in the closed state/in the drawn-in state of the storage rail 28, is arranged on the front side 33 of the storage rail 28. Thereby, it may be achieved that the individual faceplate sections 35 form a good screen with the magazine housing 27 when the storage rails 28 are drawn in. In addition to this, the faceplate sections 35 may serve for closing off the interior of the magazine housing 27 from the outside and to thus prevent that dirt can enter the interior of the magazine housing 27.

A length 36 of the storage rail 28 is preferably selected such that the tool magazine 26 fits into the production installation 1 well/that a sufficient number of bending tools 4 may be held on the storage rail 28.

As shown in FIG. 1, it appears to be a favorable installation if the tool magazine 26 is positioned next to the bending machine 3 such that a lateral wall 37 of the magazine housing 27 is in direct contact with the side wall 9, 10 of the bending machine 3. In this regard, in the pulled-out state, the individual storage rails 28 may be equipped with bending tools 4 by the machine operator/the bending tools 4 may be removed from the storage rails 28 and inserted into the bending machine 3 easily. In the drawn-in state of the storage rails 28, a front side 33 of the storage rails 28/the front side 29 of the tool magazine 26 may be flush with the front side of the bending machine 3, whereby the tool magazine 26 is not in the way of the machine operator in the closed state.

It may further be provided for that a tool tray 38, which is for example designed for holding measuring instruments or further tools serving for the maintenance of the bending machine 3, is arranged in the tool magazine 26. It may also be possible that the tool tray 38 may also be pulled out from the front side 29 of the tool magazine 26.

As can further be seen from FIGS. 1 and 2, it may moreover be provided for that at least one of the storage rails 28 can be pulled out from the lateral wall 37 of the magazine housing 27 transversely to the longitudinal extension 30. Such a storage rail 28 may serve for holding heavy bending tools 4, as the pullout width only has to be very small in order to make the bending tools 4 accessible. The storage rail 28 that can be pulled out transversely may also comprise a telescopic rail system 31, where due to the diagonal pullout, the storage rail 28 does not have to be pulled out from the magazine housing 27 thus far and thereby, the load on the telescopic rail system 31 is lower.

As can be seen particularly well from FIG. 2, the individual storage rails 28 may be arranged at different heights 43 with respect to the ground. In this regard, that storage rail 28 which is arranged at a height 43 of approximately 130 cm can be filled/emptied the easiest. It should further be taken care of that a number of storage rails 28 as high as possible is arranged in vicinity to this ergonomically favorable height.

FIG. 3 shows a sectional view of the magazine housing 27 according to section line III-III in FIG. 2, wherein again, equal reference numbers/component designations are used for equal parts as before in FIGS. 1 and 2. In order to avoid unnecessary repetitions, it is pointed to/reference is made to the detailed description in FIGS. 1 and 2 preceding it.

For reasons of clarity, FIG. 3 shows an enlarged view of an individual storage rail 28.

As can be seen from FIG. 3, it may be provided for that the storage rail 28 serves both for holding a bending die 6 and for holding a bending punch 5. In this regard, it may be provided for that a lower receiving groove 39, which serves for holding the bending punch 5, and an upper receiving groove 40, which serves for holding the bending die 6, are formed on the storage rail 28. The two receiving grooves 39, 40 may in particular be formed analogously to the tool mounts 17, 18 of the bending machine 3. It may particularly be provided for that the bending die 6 and the associated bending punch 5 are held on a common storage rail 28.

It may further be provided for that a recess 41, in which a locking tab 42 of the bending punch 5 may engage, is formed in the lower receiving groove 39. Thereby, a bending punch 5 as described in WO 2004/024361 A1 may be easily inserted into the storage rail 28.

As can be seen particularly well from FIG. 3, it may be provided for that the telescopic rail system 31 comprises a first sliding rail 44 that is held on the magazine housing 27 and a second sliding rail 45 that is held on the storage rail 28. Additionally, at least one further sliding rail 46 may be formed, which is arranged between the two sliding rails 44, 45. It may particularly be provided for in this respect, that the further sliding rail 46 is coupled to the first sliding rail 44 by means of bearing balls and that the further sliding rail 46 is coupled to the second sliding rail 45 by means of bearing balls. Instead of the bearing balls, it may also be provided for that a sliding surface guide is formed between the individual sliding rails 44, 45, 46.

In a further exemplary embodiment not depicted, it may also be provided for that merely a first sliding rail 44 and a second sliding rail 45 are formed, which intertwine and thus form a telescopic rail system 31 with reduced range. In yet another exemplary embodiment, it may also be provided for that additional, further sliding rails 46 are arranged between the first sliding rail 44 and the second sliding rail 45 and thereby, the push-out range of the telescopic rail system 31 may be enlarged.

In yet other exemplary embodiments, it is also conceivable that the telescopic rail system 31 does not comprise individual sliding rails but that the corresponding guide mechanisms are formed directly in the storage rail 28/in the magazine housing 27.

FIGS. 4 and 5 show a lateral view/a front view of a further exemplary embodiment of the tool magazine 26. As can be seen from FIGS. 4 and 5, it may be provided for that the individual storage rails 28 are locked with respect to one another by means of a locking device 47, such that only one storage rail 28 at a time can be pulled out from the magazine housing 27. By means of the locking device 47, the safety of the magazine housing 27 may be increased, as the stability against tilting of the magazine housing 27 may be improved with a maximum of one storage rail 28 being pulled out.

As can be seen from FIGS. 4 and 5, it may be provided for that the locking device 47 comprises a guide rod 48, which is mounted in the magazine housing 27 such that it can be moved up and down. Several guide pins 49 may be arranged on the guide rod 48, wherein each of the guide pins 49 may be assigned to a storage rail 28.

It may further be provided for that a guide slot 50 with which the guide pin 49 engages is arranged on the storage rail 28. In this regard, the guide slot 50 is formed such that the guide pin 49 and thus the guide rod 48 is elevated when a storage rail 28 is pulled out from the magazine housing 27.

Furthermore, a locking pin 51 formed for engaging with a locking plate 52, which is arranged on the storage rail 28, is arranged on the guide rod 48. If a storage rail 28 is now pulled out from the magazine housing 27 and the guide rod 48 is thereby elevated, the locking pin 51 engages with the locking plate 52 in the storage rails 28 located below it and above it. Thereby, these storage rails 28 are locked and it is not possible to pull these out.

In order to allow for the storage rail 28 that is to be pulled out to be pulled out without hindrance, it must be provided for that the locking plate 52 has a small longitudinal extension and that the guide slot 50 is formed such that locking pin 51 is not moved upwards until when the locking plate 52 has been moved forward sufficiently far and thus, the locking pin 51 of the storage rail 28 to be pulled out does not engage with the locking plate 52 of the storage rail 28 to be pulled out. Hence, the functionality of the pullout of the storage rail 28 may be maintained.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the teaching for technical action provided by the present invention lies within the ability of the person skilled in the art in this technical field.

The scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

LIST OF REFERENCE NUMBERS

| | |
|---|---|
| 1 | production installation |
| 2 | workpiece |
| 3 | bending machine |
| 4 | bending tool |
| 5 | bending punch |
| 6 | bending die |
| 7 | machine frame |
| 8 | base plate |
| 9 | side wall |
| 10 | side wall |
| 11 | cross connection |
| 12 | first press beam |
| 13 | linear guide |
| 14 | second press beam |
| 15 | end face |
| 16 | end face |
| 17 | first tool mount |
| 18 | second tool mount |
| 19 | driving arrangement |
| 20 | driving means |
| 21 | energy grid |
| 22 | controller |
| 23 | input terminal |
| 24 | spindle drive |
| 25 | bending edge |
| 26 | tool magazine |
| 27 | magazine housing |
| 28 | storage rail |
| 29 | front side of tool magazine |
| 30 | longitudinal expansion |
| 31 | telescopic rail system |
| 32 | storage rail compartment |
| 33 | front side of storage rail |
| 34 | handle |
| 35 | faceplate section |
| 36 | length of storage rail |
| 37 | lateral wall |
| 38 | tool tray |
| 39 | lower receiving groove |
| 40 | upper receiving groove |
| 41 | recess of receiving groove |
| 42 | locking tab |
| 43 | height |
| 44 | first sliding rail |
| 45 | second sliding rail |
| 46 | further sliding rail |
| 47 | locking device |
| 48 | guide rod |
| 49 | guide pin |
| 50 | guide slot |
| 51 | locking pin |
| 52 | locking plate |

The invention claimed is:

1. A tool magazine for holding a plurality of bending punches and for holding a plurality of bending dies, the plurality of bending punches and the plurality of bending dies being for a bending machine, wherein the tool magazine has a plurality of storage rails, which are arranged in a magazine housing and wherein one of the storage rails serves to hold a bending punch of the plurality of bending punches and to hold a bending die of the plurality of bending dies, wherein each of the storage rails has a respective longitudinal extension direction, wherein the one of the storage rails has a lower receiving groove and an upper receiving groove, wherein the lower receiving groove is designed for holding the bending punch of the plurality of bending punches and the upper receiving groove is designed for holding the bending die of the plurality of bending dies, wherein the one storage rail is designed in such a way that a plurality of the bending punches can fit lined up one behind the other in the longitudinal extension direction of the one storage rail in the lower receiving groove and wherein the one storage rail is designed in such a way that a plurality of the bending dies can fit lined up one behind the other in the longitudinal extension direction of the one storage rail in the upper receiving groove, wherein the one of the storage rails can be pulled out from a front side of the magazine housing in the longitudinal extension direction of the one storage rail.

2. The tool magazine according to claim 1, wherein the storage rails can be pulled out of the magazine housing individually and independently from one another.

3. The tool magazine according to claim 1, wherein the individual storage rails are arranged one above the other in the magazine housing.

4. The tool magazine according to claim 1, wherein a recess is arranged in the lower receiving groove, wherein the recess is configured such that a locking tab of one of the bending punches can engage in the recess.

5. The tool magazine according to claim 1, wherein the one of the storage rails is held in the magazine housing by means of a telescopic rail system.

6. The tool magazine according to claim 5, wherein the telescopic rail system comprises: a first sliding rail, which is held on the magazine housing; a second sliding rail, which is held on the one of the storage rails; and at least one third sliding rail arranged between the first sliding rail and the second sliding rail,
wherein the first sliding rail and the second sliding rail are coupled to one another by means of first bearing balls and wherein the second sliding rail and the third sliding rail are coupled to one another by means of second bearing balls.

7. The tool magazine according to claim 1, wherein a handle is arranged on a front side of the one of the storage rails.

8. The tool magazine according to claim 1, wherein a faceplate section is arranged on a front side of the one of the storage rails.

9. The tool magazine according to claim 1, wherein a plurality of storage rail compartments are arranged next to one another in the magazine housing, wherein in individual ones of the storage rail compartments, a plurality of the storage rails are arranged on top of one another.

10. The tool magazine according to claim 1, wherein at least one of the storage rails can be pulled out from a lateral wall of the magazine housing transversely to the corresponding longitudinal extension direction.

11. The tool magazine according to claim 1, wherein more than 50% of the storage rails are arranged at a height of between 60 cm and 170 cm from the ground.

12. The tool magazine according to claim 1, wherein individual ones of the storage rails are adjustable in height.

13. The tool magazine according to claim 1, wherein the individual storage rails are locked with respect to one another by means of a locking device, such that when one of the storage rails is in a pulled-out state, the further storage rails cannot be pulled out.

14. The tool magazine according to claim 1, wherein in addition to the storage rails, a tool tray is held in the magazine housing and the tool tray can be pulled out from the front side of the magazine housing.

15. The tool magazine according to claim 1, wherein the storage rails each have a respective length of between 50 cm and 200 cm.

16. A tool magazine for holding a plurality of bending punches and for holding a plurality of bending dies, the plurality of bending punches and the plurality of bending dies being for a bending machine, the tool magazine comprising:

a magazine housing;
a first storage rail arranged in the magazine housing;
a second storage rail arranged in the magazine housing;
wherein the first storage rail is configured to hold a bending punch, of the plurality of bending punches, and a bending die, of the plurality of bending dies,
wherein the first storage rail has a lower receiving groove and an upper receiving groove,
wherein the lower receiving groove is designed for holding the bending punch of the plurality of bending punches and the upper receiving groove is designed for holding the bending die of the plurality of bending dies,
wherein the first storage rail has a longitudinal extension direction,
wherein the first storage rail is designed in such a way that a plurality of the bending punches can fit lined up one behind the other in the longitudinal extension direction in the lower receiving groove and wherein the first storage rail is designed in such a way that a plurality of the bending dies can fit lined up one behind the other in the longitudinal extension direction in the upper receiving groove, and
wherein the first storage rail is configured to be pulled out from a front side of the magazine housing in a direction parallel to the longitudinal extension direction of the first storage rail.

17. A tool magazine for holding a plurality of bending punches and for holding a plurality of bending dies, the plurality of bending punches and the plurality of bending dies being for a bending machine, the tool magazine comprising:
a magazine housing;
a first storage rail arranged in the magazine housing;
a second storage rail arranged in the magazine housing;
wherein the first storage rail is configured to hold a bending punch, of the plurality of bending punches, and a bending die, of the plurality of bending dies,
wherein the first storage rail has a lower receiving groove and an upper receiving groove,
wherein the lower receiving groove is designed for holding the bending punch of the plurality of bending punches and the upper receiving groove is designed for holding the bending die of the plurality of bending dies,
wherein the first storage rail has a longitudinal extension direction,
wherein the first storage rail is designed in such a way that a plurality of the bending punches can fit lined up one behind the other in the longitudinal extension direction in the lower receiving groove and wherein the first storage rail is designed in such a way that a plurality of the bending dies can fit lined up one behind the other in the longitudinal extension direction in the upper receiving groove, and
wherein the first storage rail is configured to be pulled out from a front side of the magazine housing in a direction parallel to the longitudinal extension direction of the first storage rail,
wherein the first storage rail is held in the magazine housing by means of a first telescopic rail system and a second telescopic rail system,
wherein the first telescopic rail system is arranged on a left side of the first storage rail and
wherein the second telescopic rail system is arranged on a right side of the first storage rail.

18. A tool magazine for holding a plurality of bending punches and for holding a plurality of bending dies, the plurality of bending punches and the plurality of bending dies being for a bending machine, the tool magazine comprising:
a magazine housing;
a first storage rail arranged in the magazine housing;
a second storage rail arranged in the magazine housing;
wherein the first storage rail is configured to hold a bending punch, of the plurality of bending punches, and a bending die, of the plurality of bending dies,
wherein the first storage rail has a lower receiving groove arranged on a lower side of the first storage rail and has an upper receiving groove arranged on an upper side of the first storage rail,
wherein the lower receiving groove is designed for holding the bending punch of the plurality of bending punches and the upper receiving groove is designed for holding the bending die of the plurality of bending dies,
wherein the first storage rail has a longitudinal extension direction,
wherein the first storage rail is designed in such a way that a plurality of the bending punches can fit lined up one behind the other in the longitudinal extension direction in the lower receiving groove and wherein the first storage rail is designed in such a way that a plurality of the bending dies can fit lined up one behind the other in the longitudinal extension direction in the upper receiving groove, and
wherein the first storage rail is configured to be pulled out from a front side of the magazine housing in a direction parallel to the longitudinal extension direction of the first storage rail.

19. A tool magazine for holding a plurality of bending punches and for holding a plurality of bending dies, the plurality of bending punches and the plurality of bending dies being for a bending machine, the tool magazine comprising:
a magazine housing;
a first storage rail arranged in the magazine housing;
a second storage rail arranged in the magazine housing;
wherein the first storage rail is configured to hold a bending punch, of the plurality of bending punches, and a bending die, of the plurality of bending dies,
wherein the first storage rail has a lower receiving groove and an upper receiving groove,
wherein the lower receiving groove is designed for holding the bending punch of the plurality of bending punches and the upper receiving groove is designed for holding the bending die of the plurality of bending dies,
wherein the first storage rail has a longitudinal extension direction,
wherein the first storage rail is designed in such a way that a plurality of the bending punches can fit lined up one behind the other in the longitudinal extension direction in the lower receiving groove and wherein the first storage rail is designed in such a way that a plurality of the bending dies can fit lined up one behind the other in the longitudinal extension direction in the upper receiving groove,
wherein the first storage rail is configured to be pulled out from a front side of the magazine housing in a direction parallel to the longitudinal extension direction of the first storage rail, and
wherein the upper receiving groove and the lower receiving groove are provided in opposing faces of the first storage rail.

20. A tool magazine for holding a plurality of bending punches and for holding a plurality of bending dies, the plurality of bending punches and the plurality of bending dies being for a bending machine, the tool magazine comprising:
- a magazine housing;
- a first storage rail arranged in the magazine housing;
- a second storage rail arranged in the magazine housing;
- wherein the first storage rail is configured to hold a bending punch, of the plurality of bending punches, and a bending die, of the plurality of bending dies,
- wherein the first storage rail has a lower receiving groove and an upper receiving groove,
- wherein the lower receiving groove is designed for holding the bending punch of the plurality of bending punches and the upper receiving groove is designed for holding the bending die of the plurality of bending dies,
- wherein the lower receiving groove and the upper receiving groove are facing away from each other,
- wherein the first storage rail has a longitudinal extension direction,
- wherein the first storage rail is designed in such a way that a plurality of the bending punches can fit lined up one behind the other in the longitudinal extension direction in the lower receiving groove and wherein the first storage rail is designed in such a way that a plurality of the bending dies can fit lined up one behind the other in the longitudinal extension direction in the upper receiving groove, and
- wherein the first storage rail is configured to be pulled out from a front side of the magazine housing in a direction parallel to the longitudinal extension direction of the first storage rail.

\* \* \* \* \*